(12) United States Patent
Li et al.

(10) Patent No.: US 11,995,025 B2
(45) Date of Patent: May 28, 2024

(54) ACTIVE CABLE SUPPORTING HIGH-SPEED SIGNAL LINK TRAINING

(71) Applicant: EverPro Technologies Company Limited, Wuhan (CN)

(72) Inventors: Dezhen Li, Beijing (CN); Hui Jiang, Beijing (CN); Xinliang Zhou, Beijing (CN); Ting Chen, Beijing (CN); Yufeng Cheng, Beijing (CN); Liang Xu, Beijing (CN); Jinfeng Tian, Beijing (CN)

(73) Assignee: EVERPRO TECHNOLOGIES COMPANY LTD, Wuhan (CN)

( * ) Notice: Subject to any disclaimer, the term of this patent is extended or adjusted under 35 U.S.C. 154(b) by 29 days.

(21) Appl. No.: 18/049,866

(22) Filed: Oct. 26, 2022

(65) Prior Publication Data
US 2023/0195677 A1   Jun. 22, 2023

(30) Foreign Application Priority Data

Dec. 22, 2021 (CN) .......................... 202111575233.0
Jan. 6, 2022 (CN) .......................... 202210010717.9

(51) Int. Cl.
*G06F 13/42* (2006.01)
*G06F 13/38* (2006.01)
*G06F 13/40* (2006.01)

(52) U.S. Cl.
CPC ........ *G06F 13/4282* (2013.01); *G06F 13/382* (2013.01); *G06F 13/4068* (2013.01); *G06F 2213/0016* (2013.01)

(58) Field of Classification Search
CPC ............. G06F 13/4282; G06F 13/4068; G06F 13/382; G06F 2213/0016
See application file for complete search history.

(56) References Cited

U.S. PATENT DOCUMENTS 8,380,912 B2   2/2013   Jaramillo
9,153,198 B2   10/2015   Hunkins
(Continued)

FOREIGN PATENT DOCUMENTS

CN   102436799 A   5/2012
CN   104104539 A   10/2014
(Continued)

OTHER PUBLICATIONS

First Search from corresponding Chinese Application No. 2021115752330, dated Jan. 21, 2022, English translation attached.
(Continued)

*Primary Examiner* — Henry Tsai
*Assistant Examiner* — Christopher A Daley
(74) *Attorney, Agent, or Firm* — Grossman, Tucker, Perreault & Pfleger, PLLC

(57) ABSTRACT

An active cable supporting high-speed signal link training includes a first end, a second end, and a high-speed media signal line and a low-speed control signal line between the first end and the second end. The first end is configured for connecting a source end, the second end is configured for connecting a display end, the low-speed control signal line is configured for transmitting a low-speed sideband signal, the high-speed media signal line is configured for transmitting a high-speed media signal, and the second end is provided with, or the first end and the second end are respectively provided with a signal monitoring module connected with a signal line in the low-speed control signal line; and a high-speed signal adjusting module configured for receiving the link training data or the judgment result identified based on the link training data.

20 Claims, 4 Drawing Sheets

(56) References Cited

U.S. PATENT DOCUMENTS

| | | | |
|---|---|---|---|
| 9,348,400 | B2 | 5/2016 | Lejeune |
| 9,971,115 | B2* | 5/2018 | Jiang .................. H04B 10/516 |
| 9,979,481 | B2* | 5/2018 | Parekh ................ G02B 6/3588 |
| 10,440,424 | B2* | 10/2019 | Toba .................... H04B 10/114 |
| 10,715,356 | B2* | 7/2020 | Valliappan ........ H04L 25/03019 |
| 11,750,294 | B2* | 9/2023 | Chuang ............. H04B 10/2589 398/135 |
| 11,789,807 | B1* | 10/2023 | Kochavi ............ G06F 11/1048 714/15 |
| 11,853,251 | B2* | 12/2023 | Madhira .................... G06F 1/14 |
| 2011/0150055 | A1* | 6/2011 | Qu .......................... H04L 67/34 375/220 |
| 2014/0115192 | A1 | 4/2014 | Hunkins et al. |
| 2014/0254640 | A1 | 9/2014 | Lusted et al. |
| 2015/0181157 | A1 | 6/2015 | Kuo et al. |
| 2016/0119577 | A1 | 4/2016 | Jung et al. |
| 2018/0139428 | A1 | 5/2018 | Komiyama |
| 2019/0042507 | A1* | 2/2019 | Venkatesan ............. H04L 25/08 |
| 2020/0233166 | A1* | 7/2020 | Shimizu ............... H04B 10/073 |
| 2020/0365112 | A1 | 11/2020 | Oh |

FOREIGN PATENT DOCUMENTS

| | | | |
|---|---|---|---|
| CN | 104620562 | A | 5/2015 |
| CN | 105849711 | A | 8/2016 |
| CN | 105975419 | A | 9/2016 |
| CN | 107452353 | A | 12/2017 |
| CN | 108702466 | A | 10/2018 |
| WO | 2017151925 | A1 | 9/2017 |
| WO | 2021125055 | A1 | 6/2021 |

OTHER PUBLICATIONS

Supplementary search from corresponding Chinese Application No. 2021115752330, dated Mar. 10, 2022, English translation attached.
First Search from corresponding Chinese Application No. 2022100107179, dated Feb. 14, 2022, English translation attached.
Supplementary search from corresponding Chinese Application No. 2022100107179, dated Feb. 24, 2022, English translation attached.
Second supplementary search from corresponding Chinese Application No. 2022100107179, dated Mar. 8, 2022, English translation attached.
First Office Action from corresponding Chinese Application No. 2021115752330, dated Jan. 28, 2022, English translation attached.
Second Office Action from corresponding Chinese Application No. 2021115752330, dated Mar. 3, 2022, English translation attached.
First Office Action from corresponding Chinese Application No. 2022100107179, dated Feb. 18, 2022, English translation attached.
Second Office Action from corresponding Chinese Application No. 2022100107179, dated Mar. 2, 2022, English translation attached.

* cited by examiner

ACTIVE CABLE SUPPORTING HIGH-SPEED SIGNAL LINK TRAINING

CROSS-REFERENCE TO RELEVANT APPLICATIONS

This application claims the priority of Chinese patent application No. 2021115752330 filed on Dec. 22, 2021 and Chinese patent application No. 2022100107179 filed on Jan. 6, 2022, the entire contents of which are hereby incorporated by reference.

TECHNICAL FIELD

The present invention relates to an active cable, in particular to an active cable supporting high-speed signal link training, which can solve the problem that the existing active cable cannot participate in link training.

BACKGROUND

Active Optical Cables (AOC for short) work by converting electrical signals to optical signals or converting optical signals to electrical signals in a communication process with the help of external energy sources, and optical transceivers at both ends of the cables provide photovoltaic conversion and optical transmission functions. Active cables usually include HDMI active cables, and DP active cables.

Taking the HDMI active cables as an example, High Definition Multimedia Interface (HDMI) is a digital interface technology that can simultaneously transmit videos and sounds, which is widely used in TVs, set-top boxes and other consumer electronics. In order to adapt to signal transmission of different qualities and find the most optimal transmission link to enhance a channel bandwidth utilization, a character of link training for high-speed signals is added in HDMI 2.1 protocol, wherein a source end (Source) and a display end (Sink) negotiate parameters such as a signal amplitude from a sending end, and whether to pre-emphasize, as well as negotiate a number of high-speed signal channels and whether to reduce a communication rate according to their own supported performances and signal quality of the transmission link.

At present, the signal output amplitude of some active cables, such as active optical cables, does not change or change linearly with the signal input amplitude of the sending end, and a set of parameter settings cannot be adjusted dynamically at the optical signal receiving ends of the active cables. Even some active cables that support Clock and Data Recovery (CDR) cannot support the dynamic adjustment of the communication rate. When link training is carried out between the source end (Source) and the display end (Sink), the source end adjusts the signal amplitude output thereof according to a signal amplitude adjustment demand sent by the display end. However, the signals output to the display end by the active cables with these characteristics does not change, so the link training between the source end (Source) and the display end (Sink) is actually ineffective, which leads to longer link training time or even link training failure because the transmission link cannot reach an optimal state.

For example, for some active cables with fixed parameters of the signal receiving ends, when the signal quality of the transmission link between the sending ends and the active cables is poor, for example, a relatively long copper extension cable is added, these active cables are unable to adapt to this situation, resulting in link training failure. In addition, because the ability of the sending end or the receiving end does not support the highest rate, a resolution and a refresh rate are adjusted either on the basis of a link training result or on the basis of a user demand. When the communication rate needs to be reduced, for the CDR that does not support the dynamic adjustment of the communication rate, the link training on the CDR that does not support the dynamic adjustment of the communication rate will fail, such that normal communication is not possible.

Taking the DP (DisplayPort) active cables for example, DisplayPort is a digital interface technology that can simultaneously transmit videos and sounds, which is widely used in TVs, set-top boxes and other consumer electronics. To be compatible with transmission lines of different qualities and to find the optimal transmission link to improve channel bandwidth utilization, a character of link training for high-speed signals is added in DisplayPort protocol. Link training enables a source end (Source) and a display end (Sink) to negotiate parameters such as a signal amplitude from the source end (Source), and whether to pre-emphasize, as well as to negotiate a number of high-speed signal channels and a communication rate.

At present, the signal output amplitude of some DisplayPort active cables, such as active optical cables, does not change or change linearly with the signal input amplitude of the source end (Source), and the parameter settings cannot be adjusted dynamically at the optical signal receiving ends of the active cables. Even some active cables that support Clock and Data Recovery (CDR) cannot be dynamically adjusted according to the negotiation between the source end (Source) and the display end (Sink). When the source end adjusts the voltage output amplitude thereof according to an output voltage amplitude adjustment demand from the display end, the signals output to the display end by the output ends of the active cables with the above characteristics do not change, so the link training between the source end (Source) and the display end (Sink) is actually ineffective, which leads to longer link training time or even link training failure because the transmission link cannot reach an optimal state.

For example, for some active cables with fixed parameters of the signal receiving ends, when the signal quality of the transmission link between the source ends and the active cables is poor, for example, a relatively long copper extension cable is added, these active cables are unable to adapt to this situation, resulting in link training failure. In addition, because the ability of the source end or the display end does not support the highest rate, a resolution and a refresh rate are adjusted either on the basis of a link training result or on the basis of a user demand. When the communication rate needs to be reduced, for the CDR that does not support the dynamic adjustment of the communication rate, the link training on the CDR that does not support the dynamic adjustment of the communication rate will fail, such that normal communication is not possible.

Therefore, how to propose a cable supporting high-speed signal link training to adapt to the change of high-speed signal link training has become an urgent technical problem to be solved in the art.

SUMMARY

An object of the present invention is to provide an active cable supporting high-speed signal link training, which can solve the problem that the existing active cable cannot participate in link training by monitoring channel link training data in the active cable.

In order to achieve this object, the present invention adopts the following technical solutions.

A HDMI active cable supporting high-speed signal link training, includes:

a first end, a second end, and a high-speed media signal line and a low-speed control signal line between the first end and the second end;

the first end being configured for connecting a source end, the second end being configured for connecting a display end, the low-speed control signal line being configured for transmitting a low-speed sideband signal, and the high-speed media signal line being configured for transmitting a high-speed media signal;

wherein, the second end is provided with, or the first end and the second end are respectively provided with:

an I²C signal monitoring module connected with an I²C signal line in the low-speed control signal line, configured for monitoring link training data and sending the link training data or a judgment result identified based on the link training data to a high-speed signal adjusting module of the first end or the second end at which the I²C signal monitoring module is located;

the high-speed signal adjusting module configured for receiving the link training data or the judgment result identified based on the link training data, and dynamically adjusting a working parameter in a high-speed signal circuit according to a link training state and a high-speed signal parameter requirement judged based on the link training data, or according to the judgment result identified based on the link training data received, so as to support high-speed media signal link training; and the high-speed signal circuit configured for receiving, processing and converting a high-speed media signal, and working according to the parameter adjusted by the high-speed signal adjusting module to transmit the high-speed media signal.

Optionally, the high-speed signal adjusting module is connected with a HPD signal line in the low-speed control signal line, when the HDMI active cable is powered on, the high-speed signal adjusting module turns on the high-speed signal circuit and configures the high-speed signal circuit to a default working state, and when detecting that a HPD level is set to be high level, the high-speed signal adjusting module opens the I²C signal monitoring module.

Optionally, the I²C signal monitoring module is configured for monitoring the link training data and sending the link training data or the judgment result identified based on the link training data to the high-speed signal adjusting module of the first end or second end at which the I²C signal monitoring module is located; and the high-speed signal adjusting module dynamically adjusts the working parameter in the high-speed signal circuit according to the link training state and the high-speed signal parameter requirement judged based on the link training data, or according to the judgment result identified based on the link training data received, so as to support high-speed media signal link training, specifically including:

when the source end and the display end start high-speed data signal link training, the I²C signal monitoring module monitors the link training data, including EDID data of the display end read by the source end, and sends the EDID data or a judgment result identified based on the EDID data to the high-speed signal adjusting module; and according to the EDID data, by the high-speed signal adjusting module:

judging whether the display end supports link training and whether link training is carried out;

reading a bandwidth and a channel number of the link training, and controlling the high-speed signal circuit to adjust a CDR frequency band value, opening a corresponding high-speed signal channel, and closing an idle high-speed signal channel; and reading a parameter value of the link training to adjust the working parameter of the high-speed signal circuit in real time, and opening a corresponding number of high-speed signal channels, and closing the idle high-speed signal channel until all signal channels are completely trained.

Optionally, the link training is allowable to be carried out for multiple times, the I²C signal monitoring module monitors the link training data, the high-speed signal adjusting module continuously adjusts the parameter of the high-speed signal circuit in real time according to the link training demand, so that the active cable works in an optimum state.

Optionally, when the first end and the second end are respectively provided with the I²C signal monitoring module and the high-speed signal adjusting module, the I²C signal monitoring module of the first end and the I²C signal monitoring module of the second end respectively monitor the link training data, and jointly support high-speed media signal link training with the high-speed signal adjusting module of the first end or the second end at which the I²C signal monitoring modules are located.

Optionally, the I²C signal monitoring module of the first end responding to a monitored setting FRL_Rate value request sent by the first end to the second end, extracts the FRL_Rate value, and the high-speed signal adjusting module of the first end adjusts the working parameter in the high-speed signal circuit according to the FRL_Rate value; and/or the I²C signal monitoring module of the second end responding to the monitored setting FRL_Rate value request sent by the first end to the second end, extracts the FRL_Rate value, and the high-speed signal adjusting module of the second end adjusts the working parameter in the high-speed signal circuit according to the FRL_Rate value.

Optionally, in responding to monitoring, by the I²C signal monitoring module of the first end, that the source end sends an EDID reading request to the display end, the display end returns EDID data to the source end subsequently, then the source end sends an FRL_Ready reading request to the display end, the display end returns FRL_Ready to the source end subsequently, and then the source end sends the setting FRL_Rate value request to the display end, the high-speed signal adjusting module of the first end adjusts the working parameter in the high-speed signal circuit according to the FRL_Rate value; and/or in responding to monitoring, by the I²C signal monitoring module of the second end, that the source end sends the EDID reading request to the display end, the display end returns the EDID data to the source end subsequently, then the source end sends the FRL_Ready reading request to the display end, the display end returns the FRL_Ready to the source end subsequently, and then the source end sends the setting FRL_Rate value request to the display end, the high-speed signal adjusting module of the second end adjusts the working parameter in the high-speed signal circuit according to the FRL_Rate value.

Optionally, in responding to monitoring, by the I²C signal monitoring module of the first end, that the display end sends an FRL update request to the source end, the source end sends the setting FRL_Rate value request to the display end subsequently, the high-speed signal adjusting module of the first end adjusts the working parameter in the high-speed signal circuit according to the FRL_Rate value; and/or in responding to monitoring, by the I²C signal monitoring module of the second end, that the display end sends the FRL update request to the source end, the source end sends the setting FRL_Rate value request to the display end subsequently, the high-speed signal adjusting module of the second end adjusts the working parameter in the high-speed signal circuit according to the FRL_Rate value.

Optionally, when the link training fails, the high-speed signal adjusting module sets the HPD to low level, resets the high-speed signal circuit at the same time, and then releases the HPD to prompt the source end and the display end to carry out link training again.

Optionally, the I²C signal monitoring module is connected with an I²C signal line in the low-speed control signal line, specifically:

the I²C signal monitoring module is capable of being directly connected with the I²C signal line in the low-speed control signal line, or directly connected with an I²C pin in the first end or the second end.

A DP active cable supporting high-speed signal link training, includes:

a first end, a second end, and a high-speed media signal line and a low-speed control signal line between the first end and the second end;

the first end being configured for connecting a source end, the second end being configured for connecting a display end, the low-speed control signal line being configured for transmitting a low-speed sideband signal, and the high-speed media signal line being configured for transmitting a high-speed media signal;

wherein, the second end is provided with, or the first end and the second end are respectively provided with:

an AUX signal monitoring module connected with an AUX signal line in the low-speed control signal line, configured for monitoring link training data and sending the link training data or a judgment result identified based on the link training data to a high-speed signal adjusting module of the first end or the second end at which the AUX signal monitoring module is located;

the high-speed signal adjusting module configured for receiving the link training data or the judgment result identified based on the link training data, and dynamically adjusting a working parameter in a high-speed signal circuit according to a link training state and a high-speed signal parameter requirement judged based on the link training data, or according to the judgment result identified based on the link training data received, so as to support high-speed media signal link training; and the high-speed signal circuit configured for receiving, processing and converting a high-speed media signal, and transmitting the high-speed media signal according to the parameter adjusted by the high-speed signal adjusting module.

Optionally, the high-speed signal adjusting module is connected with a HPD signal line in the low-speed control signal line, when the DP active cable is powered on, the high-speed signal adjusting module turns on the high-speed signal circuit and configures the high-speed signal circuit to a default working state, and when detecting that a HPD level is set to be high, the high-speed signal adjusting module opens the AUX signal monitoring module.

Optionally, the AUX signal monitoring module is configured for monitoring the link training data, and sending the link training data or the judgment result identified based on the link training data to the high-speed signal adjusting module of the first end or the second end at which the AUX signal monitoring module is located;

the high-speed signal adjusting module is configured for receiving the link training data or the judgment result identified based on the link training data, and dynamically adjusting the working parameter in the high-speed signal circuit according to the link training state and the high-speed signal parameter requirement judged based on the link training data, or according to the judgment result identified based on the link training data received, so as to support high-speed media signal link training, specifically including:

when the source end and the display end start high-speed data signal link training, the AUX signal monitoring module monitors the link training data, including the DPCD data of the display end read by the source end, and sends the DPCD data or a judgment result identified based on the DPCD data to the high-speed signal adjusting module;

according to the DPCD data or the judgment result identified based on the DPCD data, by the high-speed signal adjusting module:

judging whether the display end supports link training, and a highest communication rate, a channel number and a maximum allowable voltage amplitude supported;

reading a channel number and a high-speed signal rate of the link training, and controlling the high-speed signal circuit to adjust a CDR frequency band value, opening a corresponding high-speed signal channel, and closing an idle high-speed signal channel; and reading a signal output amplitude and a signal pre-emphasis value requested by an output end of the link training, and making the high-speed signal adjusting module of the second end set a signal output amplitude and a signal pre-emphasis value of the high-speed signal circuit of the second end, and carry out link training until all signal channels are completely trained.

Optionally, the link training is allowable to be carried out for multiple times, the AUX signal monitoring module monitors the link training data, the high-speed signal adjusting module continuously adjusts the parameter of the high-speed signal circuit in real time according to the link training demand, so that the active cable works in an optimum state.

Optionally, when the first end and the second end are respectively provided with the AUX signal monitoring module and the high-speed signal adjusting module, the AUX signal monitoring module of the first end and the AUX signal monitoring module of the second end respectively monitor the link training data, and jointly support high-speed media signal link training with the high-speed signal adjusting module of the first end or the second end at which the AUX signal monitoring modules are located.

Optionally, the AUX signal monitoring module of the first end and/or the second end responds to monitoring that the source end reads the DPCD of the display end, and the AUX signal monitoring module analyzes the DPCD data or sends the DPCD data to the high-speed signal adjusting module of the first end or the second end at which the AUX signal monitoring module is located, and the high-speed signal adjusting module analyzes the DPCD data to judge the parameters of the highest communication rate, the channel number and the maximum allowable voltage amplitude supported by the display end;

subsequently, the AUX signal monitoring module of the first end and/or the second end responds to the monitoring that the source end writes fields LANE_COUNT_SET and LINK_BW_SET to the display end, and the high-speed signal adjusting module of the first end or the second end at which the AUX signal monitoring module is located opens or closes a corresponding channel of the high-speed signal circuit according to LANE_COUNT_SET, and opens or closes a CDR module of the high-speed signal circuit according to LINK_BW_SET; and subsequently, the AUX signal monitoring module of the second end responds to monitoring that the source end writes the fields VOLTAGE_SWING_SET and PRE-EMPHASIS_SET to the display end, the high-speed signal adjusting module of the second end sets a signal output amplitude of the high-speed signal circuit of the display end according to VOLTAGE_SWING_SET, and the high-speed signal adjusting module of the second end sets a signal pre-emphasis value of the high-speed signal circuit of the display end according to PRE-EMPHASIS_SET.

Optionally, in the link training, the AUX signal monitoring module of the second end responds to monitoring that the source end reads the fields VOLTAGE_SWING_LANEx and PRE_EMPHASIS_LANEx of the display end, and the high-speed signal adjusting module of the second end compares the above fields with the set values of VOLTAGE_SWING_SET and PRE-EMPHASIS_SET:

a) when the values are the same, it is indicated that the display end has no update request for output amplitude and pre-emphasis value, and the high-speed signal adjusting module of the second end keeps the current high-speed signal circuit parameter configuration; and b) when the values are different, it is indicated that the display end requests to update the output amplitude and the pre-emphasis value, and the high-speed signal adjusting module of the second end modifies the corresponding high-speed signal circuit parameter according to a requested value of the display end.

Optionally, in the link training, the AUX signal monitoring module of the first end and/or the second end responds to monitoring that the source end reads fields LANEx_CR_DONE, LANEx_CHANNEL_EQ_DONE and LANEx_SYMBOL_LOCKED of the display end; when all the above fields are 1, it is indicated that the link training is successful, and the high-speed signal adjusting module of the first end or the second end at which the AUX signal monitoring module is located keeps the current high-speed signal circuit configuration, while the AUX signal monitoring module is still working to meet a new link training demand between the source end and the display end; and when the value of some of the above fields monitored is 0, it is indicated that the link training of some or all channels under the configuration fails, and the source end re-initiates the link training by reducing a number of the high-speed signal channels or reducing the high-speed signal rate at the moment.

Optionally, when the link training is completed, the high-speed signal adjusting module of the first end and/or the second end judges that the link training fails when one of the following conditions is met:

(1) a difference between the channel number or signal rate finally set in a link training result and the maximum channel number or the highest communication rate supported by the display end exceeds a specified threshold; or (2) the channel number set in the link training is the lowest single channel or the communication rate of the link training is reduced to the lowest 1.62 Gbps.

Optionally, when the link training fails, the high-speed signal adjusting module of at least one of the first end and the second end keeps the HPD to low level beyond a hot plug time detection threshold, and the high-speed signal circuits of the first end and the second end are reset respectively, and then the high-speed signal adjusting module of one of the first end and the second end keeping the HPD to low level releases the HPD to prompt the source end and the display end to carry out the link training again.

The present invention has the following advantages.

1. By monitoring the link training process of the sideband signal, dynamically adjusting the parameter of a signal output end and triggering an adaptive process of a signal input end thereof or adjusting the parameter of the signal input end and the parameter of the CDR module, the problem that the active cables can't participate in link training and use link training to automatically adapt high-speed signals is effectively solved, and the compatibility of the active cable is improved.

2. The active cable can perform the corresponding link reset operation by setting the HPD to high/low level according to the working state of the high-speed link, and includes the parameters of resetting and reconfiguring the high-speed signal module thereof, and monitors a link training failure event, so that the active cable can be automatically adjusted to work in the optimum state, thus improving the stability of the active cable.

3. The first end and the second end may communicate information to ensure that the two ends both work in a synchronous and optimum combination state.

Figure 1:
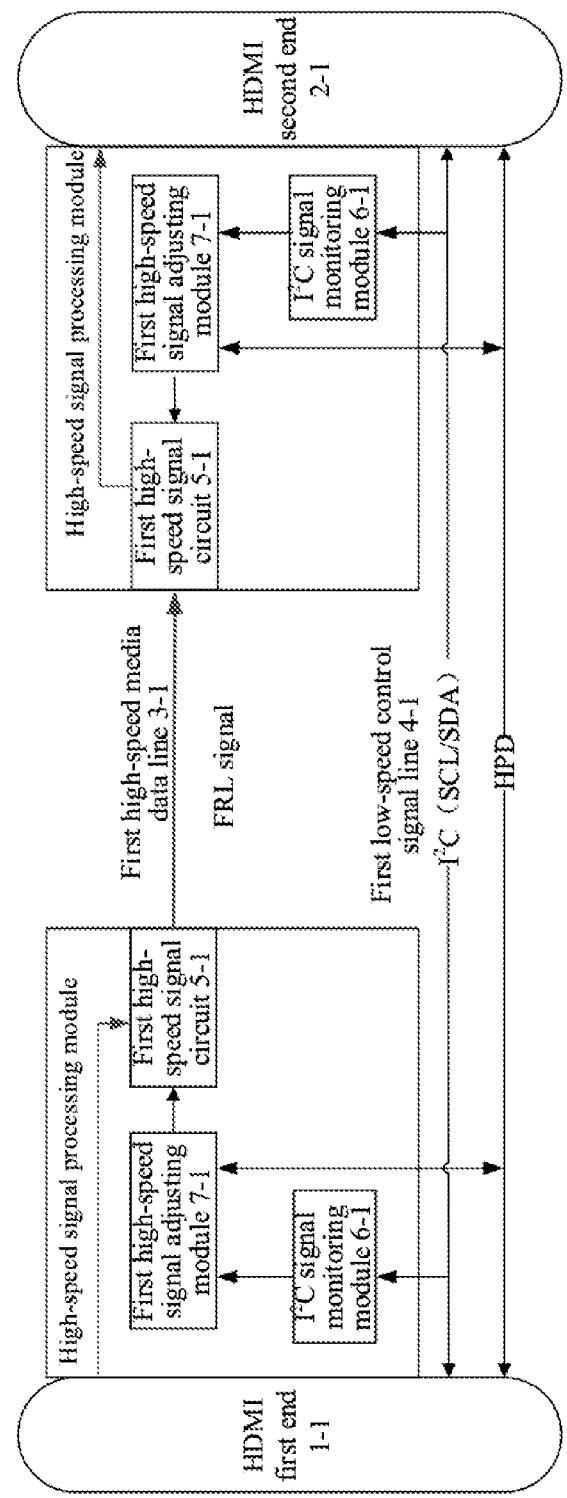
FIG. 1 is a schematic diagram of a HDMI active cable supporting high-speed signal link training according to a specific embodiment of the present invention.

Technical features respectively indicated by the reference numerals in the drawings:

1-1 refers to HDMI first end; 2-1 refers to HDMI second end; 3-1 refers to first high-speed media signal line; 4-1 refers to first low-speed control signal line; 6-1 refers to I²C signal monitoring module; and 7-1 refers to first high-speed signal adjusting module.

1-2 refers to DP first end; 2-2 refers to DP second end; 3-2 refers to second high-speed media signal line; 4-2 refers to second low-speed control signal line; 5-2 refers to second high-speed signal circuit; 6-2 refers to AUX signal monitoring module; and 7-2 refers to second high-speed signal adjusting module.

DETAILED DESCRIPTION OF THE EMBODIMENTS

The present invention will be further described in detail below with reference to the drawings and embodiments. It may be understood that the specific embodiments described herein are merely illustrative of the present invention and are not intended to limit the present invention. In addition, it should also be noted that, for ease of description, the drawings show only a part of the structure related to the present invention, but not all of the structure.

Embodiment 1

In this embodiment, it is explained by taking the active cable as a HDMI active cable for example.

An $I^2C$ signal monitoring module and a first high-speed signal adjusting module are arranged at a HDMI first end and a HDMI second end. The $I^2C$ signal monitoring module is utilized to monitor low-speed sideband signals in a first low-speed control signal line, such as $I^2C$ and Hot Plug Detect (HPD) signals, and sends link training data or a judgment result identified based on the link training data to the first high-speed signal adjusting module. A link training state and a high-speed signal parameter requirement are judged according to the link training data, or a working parameter in the first high-speed signal circuit is dynamically adjusted according to the judgment result identified based on the link training data received, the first high-speed signal circuit is dynamically configured, such as pre-emphasis and output amplitude, to meet link training demands of a source end and a display end, so as to support high-speed media signal link training.

In this way, the HDMI first end and the HDMI second end of the HDMI active cable can trigger the signal adaptive process of the signal HDMI first end and/or HDMI second end thereof according to the current link training process, such as a certain link training sequence transmitted at current, and are compatible with different link signal qualities between a Source and the active cable.

Specifically, FIG. 1 shows a schematic diagram of a HDMI active cable supporting high-speed signal link training according to a specific embodiment of the present invention.

The HDMI active cable includes: a HDMI first end 1-1, a HDMI second end 2-1, and a first high-speed media signal line 3-1 and a first low-speed control signal line 4-1 between the HDMI first end 1-1 and the HDMI second end 2-1.

The HDMI first end 1-1 is configured for connecting a source end, the HDMI second end 2-1 is configured for connecting a display end, the first low-speed control signal line 4-1 is configured for transmitting a low-speed sideband signal, and the first high-speed media signal line 3-1 is configured for transmitting a high-speed media signal;

wherein, the HDMI second end is provided with, or the HDMI first end and the HDMI second end are respectively provided with:

an $I^2C$ signal monitoring module 6-1 connected with an $I^2C$ signal line in the first low-speed control signal line 4-1, configured for monitoring link training data and sending the link training data or a judgment result identified based on the link training data to a first high-speed signal adjusting module 7-1 of the HDMI first end or the HDMI second end at which the $I^2C$ signal monitoring module is located;

for example, the $I^2C$ signal monitoring module may be directly connected with the $I^2C$ signal line in the first low-speed control signal line 4-1, or directly connected with an $I^2C$ pin in the HDMI first end 1-1, so as to be connected with an $I^2C$ channel in the low-speed sideband signal.

The $I^2C$ signal monitoring module can monitor the link training data and directly send the link training data to the first high-speed signal adjusting module 7-1.

Alternatively, the $I^2C$ signal monitoring module can monitor the link training data and send the link training data to the first high-speed signal adjusting module of the HDMI first end or the HDMI second end at which the $I^2C$ signal monitoring module is located according to the judgment result identified based on the link training data, such as FRL_Rate in Status and Control Data Channel Structure (SCDCS), FFE_Levels in SCDCS, or the like.

The first high-speed signal adjusting module 7-1 is configured for receiving the link training data or the judgment result identified based on the link training data, and dynamically adjusting a working parameter in a high-speed signal circuit according to a link training state and a high-speed signal parameter requirement judged based on the link training data, or according to the judgment result identified based on the link training data received, so as to support high-speed media signal link training.

In the present invention, the first high-speed signal adjusting module 7-1 may be a Microcontroller Unit (MCU).

The first high-speed signal circuit 5-1 is configured for receiving, processing and converting a high-speed media signal related to audios and videos. For example, the HDMI first end can receive an electrical signal sent from the source end and convert the electrical signal into an optical signal for output to an optical fiber, and the HDMI second end (close to the display end) can receive the optical signal output from the optical fiber and convert the optical signal into an electrical signal for sending to the display end.

The first high-speed signal circuit 5-1 can perform high-speed media signal link training according to a parameter modified by the first high-speed signal adjusting module 7-1.

Figure 2:
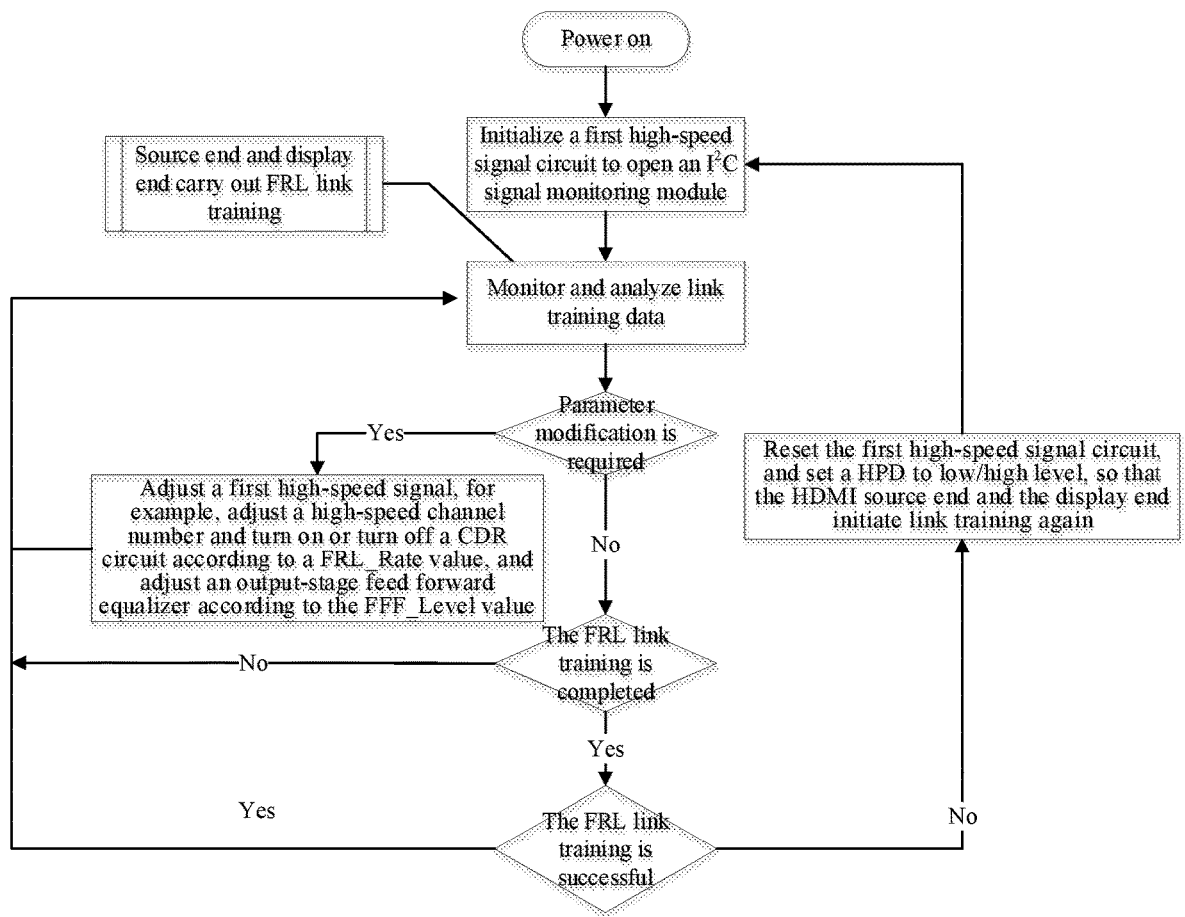
FIG. 2 is a flow chart of the HDMI active cable supporting high-speed signal link training according to the specific embodiment of the present invention.

Specifically, FIG. 2 shows a flow chart of the HDMI active cable supporting high-speed signal link training. The first high-speed signal adjusting module 7-1 is connected with a HPD signal line in the first low-speed control signal line 4-1. When the HDMI active cable is powered on, the first high-speed signal adjusting module 7-1 turns on the first high-speed signal circuit 5-1 first and configures the first high-speed signal circuit to a default working state, and when detecting that a HPD level is set to be high, the first high-speed signal adjusting module 7-1 opens the FC signal monitoring module.

The $I^2C$ signal monitoring module 6-1 monitors the link training data and the first high-speed signal adjusting module 7-1 judges the link training state and the high-speed signal parameter requirement according to the link training data, and modifies the working parameter in the first high-speed signal circuit 5-1, so as to support high-speed media signal link training, which may specifically be:

when the source end (Source) and the display end (Sink) start high-speed data signal link training, State and Control Data Channel (SCDC) data transmission is carried out through the $I^2C$ signal line during link training. In this case, the $I^2C$ signal monitoring module 6-1 can monitor the link training data, including EDID data of the display end (Sink) read by the source end (Source) and sends the EDID data or a judgment result indentified based on the EDID data to the first high-speed signal adjusting module 7-1, wherein the judgment result illustratively includes FRL_Rate in SCDCS, FFE_Levels in SCDCS, or the like.

According to the EDID data, the first high-speed signal adjusting module 7-1:

judging whether the display end (Sink) supports link training and whether link training is carried out;

reading a bandwidth and a channel number of the link training to be carried out by the source end (Source) and controlling the first high-speed signal circuit 5-1 to adjust a CDR frequency band value, opening a corresponding high-speed signal channel, and closing an idle high-speed signal channel; and reading a parameter value of the link training of the source end (Source) to adjust the working parameter of the first high-speed signal circuit 5-1, and opening a corresponding number of high-speed signal channels, and closing the idle high-speed signal channel until all signal channels are completely trained. The high-speed media signal link training is supported, and the signal specification transmitted by the source end at the sink end of the active cable is restored.

The first high-speed signal adjusting module opens the corresponding high-speed signal channel and closes the idle high-speed signal channel.

Refer to FIG. 2 for the HDMI active cable. The HDMI first end and the HDMI second end are respectively provided with the $I^2C$ signal monitoring module and the first high-speed signal adjusting module, the $I^2C$ signal monitoring module of the HDMI first end and the $I^2C$ signal monitoring module of the HDMI second end respectively monitor the link training data, and jointly support high-speed media signal link training with the first high-speed signal adjusting module of the HDMI first end or the HDMI second end at which the $I^2C$ signal monitoring modules are located. The first high-speed signal adjusting modules at the two ends can both modulate the working parameter of the first high-speed signal circuit, so as to better support high-speed media signal link training.

That is, the monitoring modules at the two ends of the HDMI cable work independently. In a collaborative training process between the display end and the source end, the monitoring modules at the two ends of the cable do not know the working condition of the opposite end, but work according to the settings thereof; or the monitoring module at one end works, while the monitoring module at the other end does not work or does not work completely.

According to a HDMI2.1 protocol specification, the process of the high-speed signal adjusting module participating in the link training is as follows.

1) First of all, the $I^2C$ signal monitoring module 6-1 monitors that the source end (Source) reads Extended Display Identification (EDID) of the display end (Sink), and transmits the data to the first high-speed signal adjusting module 7-1. The first high-speed signal adjusting module 7-1 analyzes Sink Capability Data Structure (SCDS) in the EDID data according to the HDMI2.1 protocol specification, and judges a support character of Sink on FRL link training: a field Max_FRL_Rate is greater than zero, a field SCDC_Present value is 1, and a field SCDC_Sink_Version is non-zero. When all these three conditions are met at the same time, it is indicated that the display end (sink) supports FRL link training in the HDMI2.1 protocol.

2) Next, the $I^2C$ signal monitoring module 6-1 monitors that the source end (Source) reads the field FRL_Rate written by the display end (Sink), and according to the HDMI2.1 protocol, it may be known that the field identifies a bandwidth and a channel number of the link training to be carried out by the Source. The first high-speed signal adjusting module 7-1 adjusts the CDR frequency band value according to the FRL_Rate value, and opens the corresponding number of high-speed signal channels, or closes the idle high-speed signal channel. For example, during link training, the source end may specify the number of channels participating in the link training to be 3 or 4, and these 3 or 4 channels carry out the link training at the same time. The first high-speed signal adjusting module 7-1 simultaneously opens the four channels, or simultaneously opens three channels and closes one channel.

3) Continuously, the $I^2C$ signal monitoring module 6-1 monitors that the source end (Source) writes the field FFE_Levels to the display end (Sink), and according to the HDMI2.1 protocol, it may be known that the field indicates the Feed Forward Equalizer (FFE) Level value of the signal sent by the source end (Source). The first high-speed signal adjusting module 7-1 adjusts a corresponding value of an ETX feed forward equalizer of a photoelectric conversion chip according to the FFE_Levels value, so as to restore the signal specification requirements transmitted by the source end at the sink end of the cable.

After the link training parameters are adjusted by multiple times of communication between the source end (Source) and the display end (Sink), the link training is completed. During this period, the first high-speed signal adjusting module continuously adjusts the parameter of the first high-speed signal circuit in real time according to the link training demand, so that the active cable works in an optimum state.

After the link training, the source end (Source) and the display end (Sink) communicate the link training results through a sideband signal:

1) When the link training is successful, the first high-speed signal adjusting module 7-1 keeps the current configuration of the first high-speed signal circuit, and the $I^2C$ signal monitoring module 6-1 is still working to continuously monitor the link training data to meet a new link demand between the source end (Source) and the display end (Sink).

2) When the link training fails, for example, the FRL_Rate value is 0, the first high-speed signal adjusting module sets the HPD to low level, resets the first high-speed signal circuit at the same time, and then releases the HPD to prompt the source end (Source) and the display end (Sink) to carry out link training again. In a new round of link training, the first high-speed signal adjusting module 7-1 tries to configure the first high-speed signal circuit 5-1 with new parameters, and monitors the link training result.

The above embodiment is only an example. Because the link training is staged, the $I^2C$ signal monitoring modules of the HDMI first end and the HDMI second end can respectively respond to monitoring the setting FRL_Rate value sent by the source end to the display end, so that the first high-speed signal adjusting module of the home end can adjust the working parameter in the first high-speed signal circuit of the home end according to the FRL_Rate value.

The $I^2C$ signal monitoring modules of the HDMI first end and the HDMI second end can also more reliably identify the setting FRL_Rate value sent by the source end to the display end according to each stage of the link training.

The $I^2C$ signal monitoring modules of the HDMI first end and the HDMI second end can not only monitor the link training request sent by the source end to the display end, but also conversely, the $I^2C$ signal monitoring module can monitor the link training request sent by the display end to the source end, such as the FRL update request, and the first high-speed signal adjusting module of the home end can adjust the working parameter in the first high-speed signal circuit according to the FRL_Rate value.

Further, the first high-speed signal adjusting modules 7-1 at the HDMI first end and the HDMI second end can carry out state communication in real time, and synchronize the working states of the two ends, for example, carry out state communication in real time through UART and other related communication methods.

This embodiment has the following advantages.

1. By monitoring the link training process of the sideband signal, dynamically adjusting the parameter of a signal output end and triggering an adaptive process of a signal input end thereof or adjusting the parameter of the signal input end and the parameter of the CDR module, the problem that the active cables can't participate in link training and use link training to automatically adapt high-speed signals is effectively solved, and the compatibility of the active cable is improved.

2. The active cable can perform the corresponding link reset operation by setting the HPD to high/low level according to the working state of the high-speed link, and includes the parameters of resetting and reconfiguring the high-speed signal module thereof, and monitors a link training failure event, so that the active cable can be automatically adjusted to work in the optimum state, thus improving the stability of the active cable.

3. The HDMI first end and the HDMI second end may communicate information to ensure that the two ends both work in a synchronous and optimum combination state.

Embodiment 2

In this embodiment, it is explained by taking the active cable as a DP active cable for example.

An AUX signal monitoring module and a second high-speed signal adjusting module are arranged at a DP first end and a DP second end. The AUX signal monitoring module is utilized to monitor low-speed sideband signals in a second low-speed control signal line, such as AUX and Hot Plug Detect (HPD) signals, and sends link training data or a judgment result identified based on the link training data to the second high-speed signal adjusting module. A link training state and a high-speed signal parameter requirement are judged according to the link training data, or a working parameter in the second high-speed signal circuit is dynamically adjusted according to the judgment result identified based on the link training data received, the second high-speed signal circuit is dynamically configured, such as pre-emphasis and signal output amplitude, to meet link training demands of a source end and a display end, so as to support high-speed media signal link training.

In this way, the DP first end and the DP second end of the DP active cable can trigger the signal adaptive process of the signal DP first end and/or DP second end thereof according to the current link training process, such as a certain link training sequence transmitted at current, and are compatible with different link signal qualities between a Source and the active cable.

Figure 3:
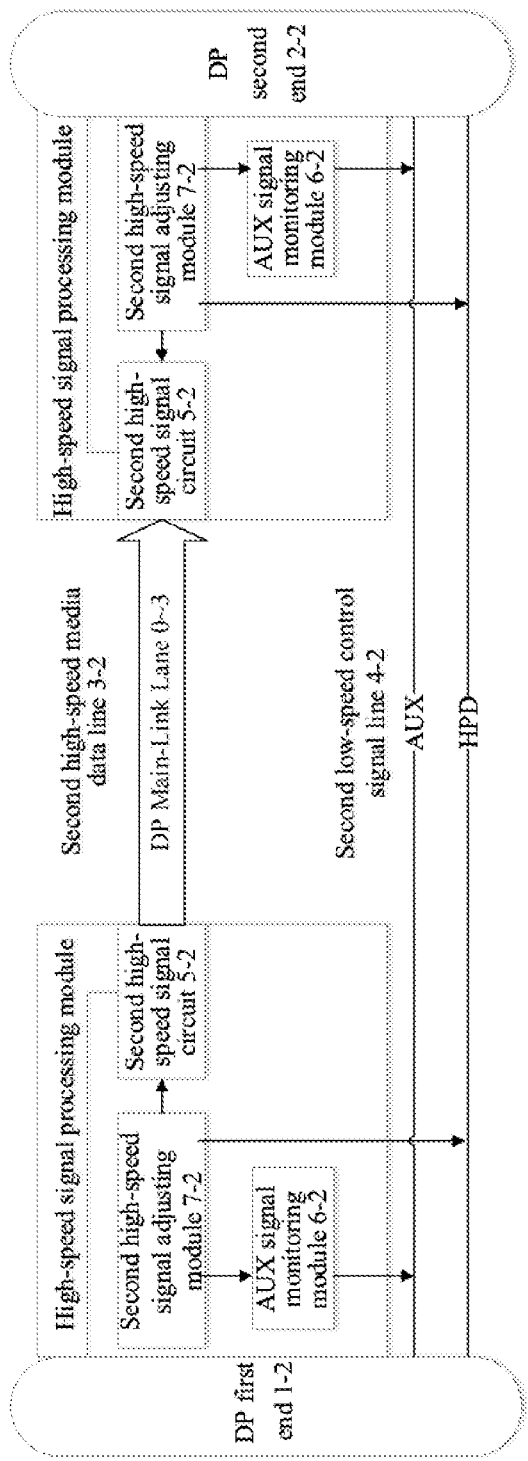
FIG. 3 is a schematic diagram of a DP active cable supporting high-speed signal link training according to a specific embodiment of the present invention.

Specifically, FIG. 3 shows a schematic diagram of a DP active cable supporting high-speed signal link training according to a specific embodiment of the present invention.

The DP active cable in the present invention is used for video-audio signal transmission, including four high-speed differential signals and a plurality of low-speed sideband signals such as AUX, Hot Plug Detect (HPD), or the like. The DP active cable processes a high-speed signal of a source end, such as using a photoelectric conversion chip to transmit the high-speed signal through an optical fiber, while a low-speed sideband signal is transmitted by using a copper wire, or transmitted after signal processing like the high-speed signal, which is used for information communication and control between the source end and a display end.

The DP active cable includes: a DP first end 1-2, a DP second end 2-2, and a second high-speed media signal line 3-2 and a second low-speed control signal line 4-2 between the DP first end 1-2 and the DP second end 2-2.

The DP first end 1-2 is configured for connecting the source end, the DP second end 2-2 is configured for connecting the display end, the second low-speed control signal line 4-2 is configured for transmitting a low-speed sideband signal, and the second high-speed media signal line 3-2 is configured for transmitting a high-speed media signal;

wherein, the DP second end is provided with, or the DP first end and the DP second end are respectively provided with:

an AUX signal monitoring module 6-2 connected with an AUX signal line in the second low-speed control signal line 4-2, configured for monitoring link training data and sending the link training data or a judgment result identified based on the link training data to a second high-speed signal adjusting module of the DP first end or the DP second end at which the AUX signal monitoring module is located;

for example, the AUX signal monitoring module may be directly connected with the AUX signal line in the second low-speed control signal line 4-2, or directly connected with an AUX pin in the DP first end 1-2, so as to be connected with an AUX channel in the low-speed sideband signal.

The AUX signal monitoring module 6-2 can monitor the link training data and directly send the link training data to the second high-speed signal adjusting module 7-2.

Alternatively, the AUX signal monitoring module can monitor the link training data and send the link training data to the second high-speed signal adjusting module of the DP first end or the DP second end at which the AUX signal monitoring module is located according to the judgment result identified based on the link training data, such as LANE_COUNT_SET and LINK_BW_SET in DisplayPort Configuration Data (DPCD), or the like.

The second high-speed signal adjusting module 7-2 is configured for receiving the link training data or the judgment result identified based on the link training data, and dynamically adjusting the working parameter in the high-speed signal circuit according to the link training state and the high-speed signal parameter requirement judged based on the link training data, or according to the judgment result identified based on the link training data received, so as to support high-speed media signal link training.

In the present invention, the second high-speed signal adjusting module 7-2 may be a Microcontroller Unit (MCU).

The second high-speed signal circuit 5-2 is configured for receiving, processing and converting a high-speed media signal related to audios and videos. For example, the DP first end can receive an electrical signal sent from the source end and convert the electrical signal into an optical signal for output to an optical fiber, and the DP second end (close to the display end) can receive the optical signal output from the optical fiber and convert the optical signal into an electrical signal for sending to the display end.

The second high-speed signal circuit 5-2 can perform high-speed media signal transmission according to a parameter modified by the second high-speed signal adjusting module 7-2.

Figure 4:
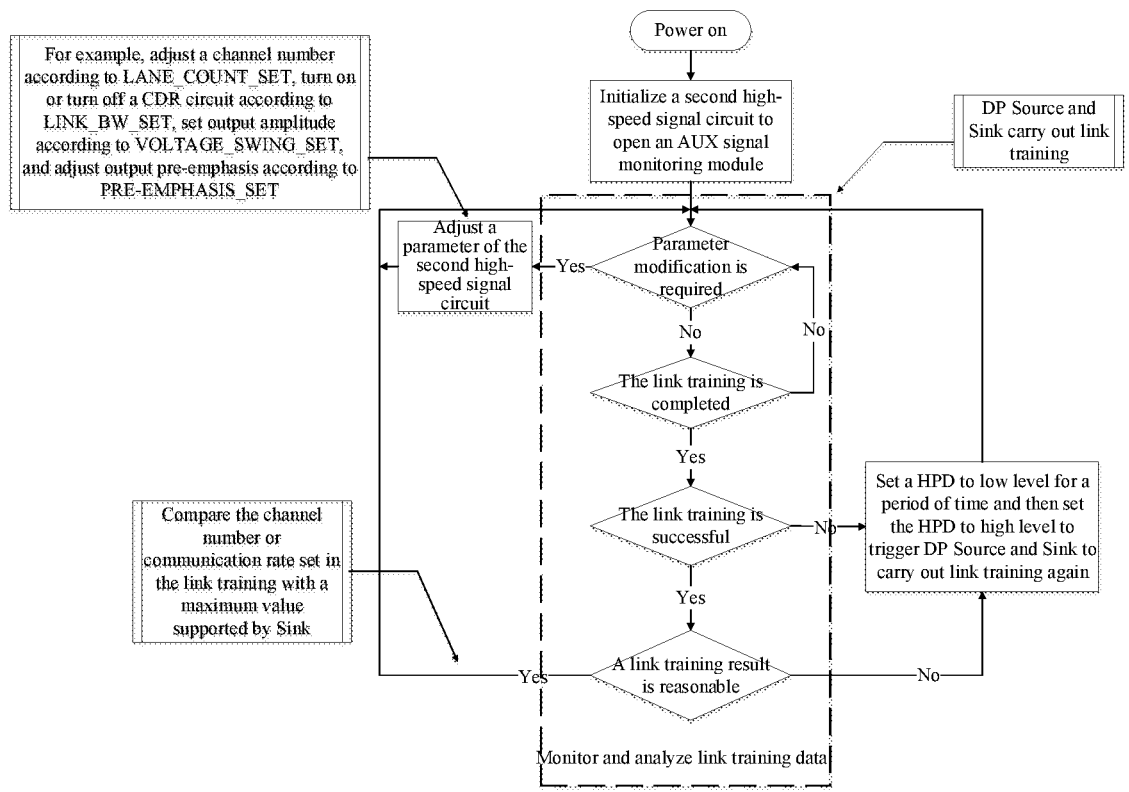
FIG. 4 is a flow chart of the DP active cable supporting high-speed signal link training according to the specific embodiment of the present invention.

Specifically, FIG. 4 shows a flow chart of the DP active cable supporting high-speed signal link training. The second high-speed signal adjusting module 7-2 is connected with a HPD signal line in the second low-speed control signal line 4-2. When the DP active cable is powered on, the second high-speed signal adjusting module 7-2 turns on the second high-speed signal circuit 5-2 and configures the second high-speed signal circuit to a default working state, and when detecting that a HPD level is set to be high, the second high-speed signal adjusting module 7-2 opens the AUX signal monitoring module.

When the source end and the display end start high-speed data signal link training, the AUX signal monitoring module 6-2 monitors the link training data, including the step of reading DPCD of the display end by the source end; and when the source end and the display end start high-speed data signal link training, the AUX signal monitoring module monitors the link training data, including DisplayPort Configuration Data (DPCD) data of the display end read by the source end, and sends the DPCD data or a judgment result identified based on the DPCD data to the second high-speed signal adjusting module.

According to the DPCD data or the judgment result identified based on the DPCD data, the second high-speed signal adjusting module 7-2:

judging whether the display end supports link training, and a highest communication rate, a channel number and a maximum allowable voltage amplitude supported;

reading a channel number and a high-speed signal rate of the link training, and controlling the second high-speed signal circuit to adjust a CDR frequency band value, opening a corresponding high-speed signal channel, and closing an idle high-speed signal channel; and reading a signal output amplitude and a signal pre-emphasis value requested by an output end of the link training, and making the second high-speed signal adjusting module of the DP second end set a signal output amplitude and a signal pre-emphasis value of the second high-speed signal circuit of the DP second end, and carrying out link training until all signal channels are completely trained.

The link training is allowable to be carried out for multiple times, the AUX signal monitoring module 6-2 monitors the link training data, the second high-speed signal adjusting module 7-2 continuously adjusts the parameter of the second high-speed signal circuit in real time according to the link training demand, so that the active cable works in an optimum state.

In the present invention, referring to FIG. 4, the DP first end and the DP second end are respectively provided with the AUX signal monitoring module 6-2 and the second high-speed signal adjusting module 7-2, the AUX signal monitoring module 6-2 of the DP first end and the AUX signal monitoring module 6-2 of the DP second end respectively monitor the link training data, and jointly support high-speed media signal link training with the second high-speed signal adjusting module 7-2 of the DP first end or the DP second end at which the AUX signal monitoring modules are located. The second high-speed signal adjusting modules at the two ends can both modulate the working parameter of the second high-speed signal circuit, so as to better support high-speed media signal link training.

According to a DisplayPort protocol specification, the process of the high-speed signal adjusting module participating in the link training is as follows:

1) First of all, the AUX signal monitoring module 6-2 of the DP first end and/or the DP second end monitors that the source end (Source) reads the DPCD of the display end (Sink) and transmits the data to the second high-speed signal adjusting module 7-2 of the DP first end or the DP second end at which the AUX signal monitoring module is located. The second high-speed signal adjusting module 7-2 analyzes DPCD data according to the DisplayPort protocol specification, and judges parameters such as a highest communication rate, a channel number and a maximum allowable voltage amplitude supported by the display end.

In this step, the read parameters such as the highest communication rate, the channel number and the maximum allowable voltage amplitude supported by the display end may be used to compare with the link training result after the link training is completed, and when the difference is large, the link training may be carried out again, for example, the link training is prompted to be carried by means of setting the HPD to low level.

2) Then, the AUX signal monitoring module 6-2 of the DP first end and/or the DP second end monitors that the source end (Source) writes fields LANE_COUNT_SET and LINK_BW_SET to the display end (Sink).

The second high-speed signal adjusting module 7-2 of the DP first end or the DP second end at which the AUX signal monitoring module is located opens or closes a corresponding channel of the second high-speed signal circuit according to LANE_COUNT_SET. For example, in case of 02h, high-speed signal channels 0 and 1 are opened, while high-speed signal channels 2 and 3 are closed. Through this parameter, the second high-speed signal adjusting module sets the channel number participating in the link training.

The second high-speed signal adjusting module 7-2 opens or closes a CDR module of the second high-speed signal circuit according to LINK_BW_SET, for example, in case of 1Eh, the high-speed signal rate is set and the second high-speed signal adjusting module sets the high-speed signal rate participating in the link training through this parameter.

3) Next, the AUX signal monitoring module 6-2 of the DP second end monitors that the source end (Source) writes fields VOLTAGE_SWING_SET and PRE-EMPHASIS_SET to the display end (Sink).

The second high-speed signal adjusting module 7-2 of the DP second end sets a signal output amplitude of the second high-speed signal circuit of the display end according to VOLTAGE_SWING_SET, and through this parameter, the second high-speed signal adjusting module of the DP second end sets a signal output amplitude of an output end of the link training.

The second high-speed signal adjusting module 7-2 of the DP second end sets a signal pre-emphasis value of the second high-speed signal circuit of the display end according to PRE-EMPHASIS_SET, and through this parameter, the second high-speed signal adjusting module of the DP second end sets a signal pre-emphasis value of the output end of the link training.

4) After the link training parameters are written, the source end sends a specific high-speed signal training sequence to the display end to start the link training.

Further, in the training process, the source end may inquire whether the display end requests to change the output amplitude and pre-emphasis value of some or all high-speed signal channels. Specifically, the AUX signal monitoring module of the DP second end may monitor that the source end reads the fields VOLTAGE_SWING_LANEx and PRE_EMPHASIS_LANEx of the display end, such as values of DPCD addresses 00206h~000207h, and the second high-speed signal adjusting module 7-2 compares the above fields with the set values of VOLTAGE_SWING_SET and PRE-EMPHASIS_SET:

a) when the values are the same, it is indicated that the display end has no update request for output amplitude and pre-emphasis value, and the second high-speed signal adjusting module 7-2 of the DP second end may keep the current second high-speed signal circuit parameter configuration; and
  b) when the values are different, it is indicated that the display end requests to update the output amplitude and the pre-emphasis value, and the second high-speed signal adjusting module 7-2 of the DP second end modifies the corresponding second high-speed signal circuit parameter according to a requested value of the display end.

Further, in the training process, the source end may inquire the link training result of each high-speed signal channel, specifically: the AUX signal monitoring module of the DP first end and/or the second end may monitor that the source end reads the values of the DPCD addresses 00202h~00203h of the display end, i.e., the fields LANEx_CR_DONE, LANEx_CHANNEL_EQ_DONE and LANEx_SYMBOL_LOCKED; when all the above fields are 1, it is indicated that the link training is successful, and the second high-speed signal adjusting module of the DP first end or the DP second end at which the AUX signal monitoring module is located keeps the current second high-speed signal circuit configuration. In this case, the AUX signal monitoring module is still working to meet a new link training demand between the source end and the display end. when the value of some of the above fields monitored is 0, it is indicated that the link training of some or all channels under the configuration fails, and the source end re-initiates the link training by reducing a number of the high-speed signal channels or reducing the high-speed signal rate at the moment. In this case, the AUX signal monitoring module may monitor a filed writing operation of the source end to the link training parameter of the display end.

Further, the link training is allowable to be carried out for multiple times, the AUX signal monitoring module 6-2 monitors the link training data, the second high-speed signal adjusting module 7-2 continuously adjusts the parameter of the second high-speed signal circuit in real time according to the link training demand, so that the active cable works in an optimum state.

Further, when the link training is completed, the second high-speed signal adjusting module 7-2 of the DP first end or the DP second end at which the AUX signal monitoring module is located judges that the link training fails when one of the following conditions is met:

(1) a difference between the channel number or signal rate finally set in a link training result and the maximum channel number or the highest communication rate supported by the display end exceeds a specified threshold; or
  (2) the channel number set in the link training is the lowest single channel (1-Lane) or the communication rate of the link training is reduced to the lowest 1.62 Gbps.

In this case, the second high-speed signal adjusting module of one of the DP first and the DP second end keeps the HPD at low level for a period of time beyond a hot plug time detection threshold, and the second high-speed signal circuits of the DP first end and the DP second end are reset respectively, and then the high-speed signal adjusting module of one of the DP first end and the DP second end keeping the HPD to low level releases the HPD, that is, the second high-speed signal adjusting module setting the HPD to low level releases the HPD again to prompt the source end (Source) and the display end (Sink) to carry out the link training again. In a new round of link training, the second high-speed signal adjusting module 7-2 tries to configure the second high-speed signal circuit 5-2 with new parameters, and monitors the link training result.

Of course, in the link training, the display end may actively sets the HPD to low level, and the second high-speed signal adjusting module may identify whether the display end makes an action of setting the HPD to low level. If the display end does not make the action, the second high-speed signal adjusting module may actively set the HPD to low level and carry out the link training again.

Further, the second high-speed signal adjusting modules 7-2 at the DP first end and the DP second end can carry out state communication in real time, and synchronize the working states of the two ends, for example, carry out state communication in real time through UART and other related communication methods.

This embodiment has the following advantages.

1. By monitoring the link training process of the sideband signal, dynamically adjusting the parameter of a signal output end and triggering an adaptive process of a signal input end thereof or adjusting the parameter of the signal input end and the parameter of the CDR module, the problem that the active cables can't participate in link training and use link training to automatically adapt high-speed signals is effectively solved, and the compatibility of the active cable is improved.

2. The active cable can perform the corresponding link reset operation by setting the HPD to high/low level according to the working state of the high-speed link, and includes the parameters of resetting and reconfiguring the high-speed signal module thereof, and monitors a link training failure event, so that the active cable can be automatically adjusted to work in the optimum state, thus improving the stability of the active cable.

3. The DP first end and the DP second end may communicate information to ensure that the two ends both work in a synchronous and optimum combination state.

The above is a further detailed description of the present invention in combination with the specific preferred embodiments, but it should not be considered that the specific embodiments of the present invention are limited to this. For those of ordinary skills in the art to which the present invention belongs, some simple deduction or substitution can be made without departing from the concept of the present invention, which should be regarded as belonging to the scope of protection of the present invention as determined by the submitted claims.

What is claimed is:

1. An active cable supporting high-speed signal link training, comprising:
  a first end, a second end, and a high-speed media signal line and a low-speed control signal line between the first end and the second end;
  the first end being configured for connecting a source end, the second end being configured for connecting a display end, the low-speed control signal line being configured for transmitting a low-speed sideband signal, and the high-speed media signal line being configured for transmitting a high-speed media signal;
  wherein, the second end is provided with, or the first end and the second end are respectively provided with:

a signal monitoring module connected with a signal line in the low-speed control signal line, configured for monitoring link training data and sending the link training data or a judgment result identified based on the link training data to a high-speed signal adjusting module of the first end or the second end at which the signal monitoring module is located;

the high-speed signal adjusting module configured for receiving the link training data or the judgment result identified based on the link training data, and dynamically adjusting a working parameter in a high-speed signal circuit according to a link training state and a high-speed signal parameter requirement judged based on the link training data, or according to the judgment result identified based on the link training data received, so as to support high-speed media signal link training; and the high-speed signal circuit configured for receiving, processing and converting a high-speed media signal, and transmitting the high-speed media signal according to the parameter adjusted by the high-speed signal adjusting module.

2. The active cable according to claim 1, wherein:
the high-speed signal adjusting module is connected with a HPD signal line in the low-speed control signal line, when the active cable is powered on, the high-speed signal adjusting module turns on the high-speed signal circuit and configures the high-speed signal circuit to a default working state, and when detecting that a HPD level is set to high level, the high-speed signal adjusting module opens the signal monitoring module.

3. The active cable according to claim 1, wherein:
the active cable is a HDMI active cable; and
the signal monitoring module is an $I^2C$ signal monitoring module.

4. The active cable according to claim 3, wherein:
the $I^2C$ signal monitoring module is configured for monitoring the link training data and sending the link training data or the judgment result identified based on the link training data to the high-speed signal adjusting module of the first end or second end at which the signal monitoring module is located; and the high-speed signal adjusting module dynamically adjusts the working parameter in the high-speed signal circuit according to the link training state and the high-speed signal parameter requirement judged based on the link training data, or according to the judgment result identified based on the link training data received, so as to support high-speed media signal link training, specifically comprising:

when the source end and the display end start high-speed data signal link training, the $I^2C$ signal monitoring module monitors the link training data, comprising EDID data of the display end read by the source end, and sends the EDID data or a judgment result identified based on the EDID data to the high-speed signal adjusting module; and according to the EDID data, by the high-speed signal adjusting module:

judging whether the display end supports link training and whether link training is carried out;

reading a bandwidth and a channel number of the link training, and controlling the high-speed signal circuit to adjust a CDR frequency band value, opening a corresponding high-speed signal channel, and closing an idle high-speed signal channel; and reading a parameter value of the link training to adjust the working parameter of the high-speed signal circuit in real time, and opening a corresponding number of high-speed signal channels, and closing the idle high-speed signal channel, until all signal channels are completely trained.

5. The active cable according to claim 4, wherein:
the link training is allowable to be carried out for multiple times, the $I^2C$ signal monitoring module monitors the link training data, the high-speed signal adjusting module continuously adjusts the parameter of the high-speed signal circuit in real time according to the link training demand, so that the active cable works in an optimum state.

6. The active cable according to claim 3, wherein:
when the first end is provided with the FC signal monitoring module, the $I^2C$ signal monitoring module of the first end responding to a monitored setting FRL_Rate value request sent by the first end to the second end, extracts the FRL_Rate value, and the high-speed signal adjusting module of the first end adjusts the working parameter in the high-speed signal circuit according to the FRL_Rate value; and/or the $I^2C$ signal monitoring module of the second end responding to the monitored setting FRL_Rate value request sent by the first end to the second end, extracts the FRL_Rate value, and the high-speed signal adjusting module of the second end adjusts the working parameter in the high-speed signal circuit according to the FRL_Rate value.

7. The active cable according to claim 3, wherein:
in responding to monitoring, by the $I^2C$ signal monitoring module of the first end, that the source end sends an EDID reading request to the display end, the display end returns EDID data to the source end subsequently, then the source end sends an FRL_Ready reading request to the display end, the display end returns FRL_Ready to the source end subsequently, and then the source end sends the setting FRL_Rate value request to the display end, the high-speed signal adjusting module of the first end adjusts the working parameter in the high-speed signal circuit according to the FRL_Rate value; and/or in responding to monitoring, by the $I^2C$ signal monitoring module of the second end, that the source end sends the EDID reading request to the display end, the display end returns the EDID data to the source end subsequently, then the source end sends the FRL_Ready reading request to the display end, the display end returns the FRL_Ready to the source end subsequently, and then the source end sends the setting FRL_Rate value request to the display end, the high-speed signal adjusting module of the second end adjusts the working parameter in the high-speed signal circuit according to the FRL_Rate value.

8. The active cable according to claim 7, wherein:
in responding to monitoring, by the $I^2C$ signal monitoring module of the first end, that the display end sends an FRL update request to the source end, the source end sends the setting FRL_Rate value to the display end subsequently, the high-speed signal adjusting module of the first end adjusts the working parameter in the high-speed signal circuit according to the FRL_Rate value; and/or in responding to monitoring, by the $I^2C$ signal monitoring module of the second end, that the display end sends the FRL update request to the source end, the source end sends the setting FRL_Rate value to the display end subsequently, the high-speed signal adjusting module of the second end adjusts the working parameter in the high-speed signal circuit according to the FRL_Rate value.

9. The active cable according to claim 3, wherein:
when the link training fails, the high-speed signal adjusting module sets the HPD to low level, resets the high-speed signal circuit at the same time, and then releases the HPD to prompt the source end and the display end to carry out link training again.

10. The active cable according to claim 3, wherein:
the I²C signal monitoring module is connected with an I²C signal line in the low-speed control signal line, specifically:
the I²C signal monitoring module is capable of being directly connected with the I²C signal line in the low-speed control signal line, or directly connected with an I²C pin in the first end or the second end.

11. The active cable according to claim 1, wherein:
the active cable is a DP active cable; and
the signal monitoring module is an AUX signal monitoring module.

12. The active cable according to claim 11, wherein:
the AUX signal monitoring module is configured for monitoring the link training data, and sending the link training data or the judgment result identified based on the link training data to the high-speed signal adjusting module of the first end or the second end at which the AUX signal monitoring module is located;
the high-speed signal adjusting module is configured for receiving the link training data or the judgment result identified based on the link training data, and dynamically adjusting the working parameter in the high-speed signal circuit according to the link training state and the high-speed signal parameter requirement judged based on the link training data, or according to the judgment result identified based on the link training data received, so as to support high-speed media signal link training, specifically comprising:
when the source end and the display end start high-speed data signal link training, the AUX signal monitoring module monitors the link training data, comprising the DPCD data of the display end read by the source end, and sends the DPCD data or a judgment result identified based on the DPCD data to the high-speed signal adjusting module;
according to the DPCD data or the judgment result identified based on the DPCD data, by the high-speed signal adjusting module:
judging whether the display end supports link training, and a highest communication rate, a channel number and a maximum allowable voltage amplitude supported;
reading a channel number and a high-speed signal rate of the link training, and controlling the high-speed signal circuit to adjust a CDR frequency band value, opening a corresponding high-speed signal channel, and closing an idle high-speed signal channel; and
reading a signal output amplitude and a signal pre-emphasis value requested by an output end of the link training, and making the high-speed signal adjusting module of the second end set a signal output amplitude and a signal pre-emphasis value of the high-speed signal circuit of the second end, and carry out link training until all signal channels are completely trained.

13. The active cable according to claim 11, wherein:
the link training is allowable to be carried out for multiple times, the AUX signal monitoring module monitors the link training data, the high-speed signal adjusting module continuously adjusts the parameter of the high-speed signal circuit in real time according to the link training demand, so that the active cable works in an optimum state.

14. The active cable according to claim 11, wherein:
the AUX signal monitoring module of at least one of the first end and the second end responds to monitoring that the source end reads the DPCD of the display end, and the AUX signal monitoring module analyzes the DPCD data or sends the DPCD data to the high-speed signal adjusting module of the first end or the second end at which the AUX signal monitoring module is located, and the high-speed signal adjusting module analyzes the DPCD data to judge the parameters of the highest communication rate, the channel number and the maximum allowable voltage amplitude supported by the display end;
subsequently, the AUX signal monitoring module of at least one of the first end and the second end responds to the monitoring that the source end writes fields LANE_COUNT_SET and LINK_BW_SET to the display end, and the high-speed signal adjusting module of the first end or the second end at which the AUX signal monitoring module is located opens or closes a corresponding channel of the high-speed signal circuit according to LANE_COUNT_SET, and opens or closes a CDR module of the high-speed signal circuit according to LINK_BW_SET; and
subsequently, the AUX signal monitoring module of the second end responds to monitoring that the source end writes fields VOLTAGE_SWING_SET and PRE-EMPHASIS_SET to the display end, the high-speed signal adjusting module of the second end sets a signal output amplitude of the high-speed signal circuit of the display end according to VOLTAGE_SWING_SET, and the high-speed signal adjusting module of the second end sets a signal pre-emphasis value of the high-speed signal circuit of the display end according to PRE-EMPHASIS_SET.

15. The active cable according to claim 14, wherein:
in the link training, the AUX signal monitoring module of the second end responds to monitoring that the source end reads the fields VOLTAGE_SWING_LANEx and PRE_EMPHASIS_LANEx of the display end, and the high-speed signal adjusting module of the second end compares the above fields with the set values of VOLTAGE_SWING_SET and PRE-EMPHASIS_SET:
a) when the values are the same, it is indicated that the display end has no update request for output amplitude and pre-emphasis value, and the high-speed signal adjusting module of the second end keeps the current high-speed signal circuit parameter configuration; and
b) when the values are different, it is indicated that the display end requests to update the output amplitude and the pre-emphasis value, and the high-speed signal adjusting module of the second end modifies the corresponding high-speed signal circuit parameter according to a requested value of the display end.

16. The active cable according to claim 15, wherein:
in the link training, the AUX signal monitoring module of at least one of the first end and the second end responds to monitoring that the source end reads fields LANEx_CR_DONE, LANEx_CHANNEL_EQ_DONE and LANEx_SYMBOL_LOCKED of the display end;

when all the above fields are 1, it is indicated that the link training is successful, and the high-speed signal adjusting module of the first end or the second end at which the AUX signal monitoring module is located keeps the current high-speed signal circuit configuration, while the AUX signal monitoring module is still working to meet a new link training demand between the source end and the display end; and when the value of some of the above fields monitored is 0, it is indicated that the link training of some or all channels under the configuration fails, and the source end re-initiates the link training by reducing a number of the high-speed signal channels or reducing the high-speed signal rate at the moment.

17. The active cable according to claim 16, wherein: when the link training is completed, the high-speed signal adjusting module of at least one of the first end and the second end judges that the link training fails when one of the following conditions is met:
(1) a difference between the channel number or signal rate finally set in a link training result and the maximum channel number or the highest communication rate supported by the display end exceeds a specified threshold; or
(2) the channel number set in the link training is the lowest single channel or the communication rate of the link training is reduced to the lowest 1.62 Gbps.

18. The active cable according to claim 17, wherein: when the link training fails, the high-speed signal adjusting module of at least one of the first end and the second end keeps the HPD at low level beyond a hot plug time detection threshold, and the high-speed signal circuits of the first end and the second end are reset respectively, and then the high-speed signal adjusting module of one of the first end and the second end keeping the HPD at low level releases the HPD to prompt the source end and the display end to carry out the link training again.

19. A HDMI active cable supporting high-speed signal link training, comprising:
a first end, a second end, and a high-speed media signal line and a low-speed control signal line between the first end and the second end;
the low-speed control signal line being configured for transmitting a low-speed sideband signal, and the high-speed media signal line being configured for transmitting a high-speed media signal;
wherein, the second end is provided with, or the first end and the second end are respectively provided with:
an $I^2C$ signal monitoring module connected with an $I^2C$ signal line in the low-speed control signal line, configured for monitoring link training data and sending the link training data or a judgment result identified based on the link training data to a high-speed signal adjusting module of the first end or the second end at which the $I^2C$ signal monitoring module is located;
the high-speed signal adjusting module configured for receiving the link training data or the judgment result identified based on the link training data, and dynamically adjusting a working parameter in a high-speed signal circuit according to a link training state and a high-speed signal parameter requirement judged based on the link training data, or according to the judgment result identified based on the link training data received, so as to support high-speed media signal link training; and
the high-speed signal circuit configured for receiving, processing and converting a high-speed media signal, and working according to the parameter adjusted by the high-speed signal adjusting module to transmit the high-speed media signal.

20. A DP active cable supporting high-speed signal link training, comprising:
a first end, a second end, and a high-speed media signal line and a low-speed control signal line between the first end and the second end;
the low-speed control signal line being configured for transmitting a low-speed sideband signal, and the high-speed media signal line being configured for transmitting a high-speed media signal;
wherein, the second end is provided with, or the first end and the second end are respectively provided with:
an AUX signal monitoring module connected with an AUX signal line in the low-speed control signal line, configured for monitoring link training data and sending the link training data or a judgment result identified based on the link training data to a high-speed signal adjusting module of the first end or the second end at which the AUX signal monitoring module is located;
the high-speed signal adjusting module configured for receiving the link training data or the judgment result identified based on the link training data, and dynamically adjusting a working parameter in a high-speed signal circuit according to a link training state and a high-speed signal parameter requirement judged based on the link training data, or according to the judgment result identified based on the link training data received, so as to support high-speed media signal link training; and
the high-speed signal circuit configured for receiving, processing and converting a high-speed media signal, and transmitting the high-speed media signal according to the parameter adjusted by the high-speed signal adjusting module.

* * * * *